(12) United States Patent
Tsai

(10) Patent No.: US 11,970,241 B2
(45) Date of Patent: Apr. 30, 2024

(54) BRAKE HANDLE STRUCTURE FOR BICYCLE

(71) Applicant: JOY INDUSTRIAL (SHENZHEN) CO., LTD., Bao An Shen Zhen (CN)

(72) Inventor: Chien-Yuan Tsai, Bao An Shen Zhen (CN)

(73) Assignee: Joy Industrial (Shenzhen) Co., Ltd., Bao An Shen Zhen (CN)

( * ) Notice: Subject to any disclaimer, the term of this patent is extended or adjusted under 35 U.S.C. 154(b) by 399 days.

(21) Appl. No.: 17/491,860

(22) Filed: Oct. 1, 2021

(65) Prior Publication Data

US 2023/0103940 A1    Apr. 6, 2023

(51) Int. Cl.
*B62L 3/02*    (2006.01)
(52) U.S. Cl.
CPC ...................... *B62L 3/02* (2013.01)
(58) Field of Classification Search
None
See application file for complete search history.

(56) References Cited

U.S. PATENT DOCUMENTS

2013/0228405 A1*  9/2013  Tsai ..................... B62J 45/422
                                                   188/344

FOREIGN PATENT DOCUMENTS

| CN | 104875839 A | * | 9/2015 | ............ B60T 13/748 |
| CN | 113147991 A | * | 7/2021 | ............ B62J 45/41 |
| WO | WO-2017167300 A1 | * | 10/2017 | ............ B60L 50/20 |

* cited by examiner

*Primary Examiner* — Melanie Torres Williams
(74) *Attorney, Agent, or Firm* — Rosenberg, Klein & Lee

(57) ABSTRACT

A brake handle structure for a bicycle contains: at least one body, at least one rotatory arm, at least one brake lever, at least one angle signal sensor, and at least one power failure sensor. The at least one body includes a connection portion, an extension, and an engagement portion. The at least one rotatory arm includes a pulling segment, a coupling orifice, and a receiving orifice. The at least one brake lever includes a fixing segment connected with at least one electromagnetic clutch which includes a bolt attracted electromagnetically by the at least one electromagnetic clutch after conducting a power, and a defining orifice is defined adjacent to the at least one electromagnetic clutch. The at least one angle signal sensor is configured to sense and send a rotating angle of the rotatable column. The at least one power failure sensor has a movable sensing head.

3 Claims, 9 Drawing Sheets

BRAKE HANDLE STRUCTURE FOR BICYCLE

FIELD OF THE INVENTION

The present invention relates to a brake handle structure for a bicycle which is capable of controlling an anti-lock brake mechanically or electrically.

BACKGROUND OF THE INVENTION

A conventional brake system of a bicycle contains at least one brake cable configured to control two opposite rubber braking clampers to clamp a rim of a wheel. However, when pressing a brake layer suddenly, the wheel is locked tightly to cause a braking accident. To overcome such a problem, an anti-lock brake for a bicycle mechanism is disclosed in TW Patent Nos. 1644826 and 1649232. Furthermore, an automatic adjustment device for braking a bicycle is disclosed in Taiwan Patent No. 1522275.

An anti-lock brake operated mechanically is disclosed in TW Patent No. 1644826 and contains a pneumatic brake lever connected with an oil channel of a hydraulic adjustment cylinder directly or via a connection element, such that when pressing the pneumatic brake lever, a brake fluid is feed into a first oil path of a first piston from the oil channel to flow into an output conduit via a chamber, then the hydraulic calipers are driven by the brake fluid to clamp a disc brake of the wheel of the bicycle, thus braking the bicycle.

An intermittent anti-lock brake apparatus of a bicycle is disclosed in TW Utility Model No. M519114 and is mounted on a predetermined position between a brake cable and a handle, wherein the intermittent anti-lock brake apparatus contains a body, a resilient sheet, an abutting element, and a deferment element. The body accommodates the resilient sheet, the abutting element, and the deferment element, wherein when the deferment element is pressed by the resilient sheet, two ends of the abutting element connects with the brake cable and the handle. The abutting element has a contact segment extending downward, and the deferment element has multiple concave faces and multiple convex faces on which the contact segment move back and forth. When the handle pulls the brake cable via the abutting element, the wheel is braked, and a movement travel of the abutting element is prolonged after a jumping of the deferment element, thus avoiding an instant anti-lock brake of the bicycle.

However, the intermittent anti-lock brake apparatus is operated mechanically, such as pressing a brake lever to pull the brake cable, thus starting the intermittent anti-lock brake apparatus.

The present invention has arisen to mitigate and/or obviate the afore-described disadvantages.

SUMMARY OF THE INVENTION

The primary aspect of the present invention is to provide a brake handle structure for a bicycle which is capable of controlling an anti-lock brake mechanically or electrically.

To obtain above-mentioned aspects, a brake handle structure for a bicycle provided by the present invention contains: at least one body, at least one rotatory arm, at least one brake lever, at least one angle signal sensor, and at least one power failure sensor.

The at least one body includes a connection portion formed on a first end of the at least one body, an extension having a first side connected with a first side of the connection portion, and an engagement portion connected with a second side of the extension. The connection portion receives a brake cable unit and has a through orifice defined on a predetermined position of the connection portion.

The at least one rotatory arm is received in the connection portion and is rotatably connected in the extension, and the at least one rotary arm includes a pulling segment formed on a first end of the at least one rotary arm so as to pull the brake cable unit, a coupling orifice defined on a second end of the at least one rotary arm, and a receiving orifice passing between the coupling orifice and the pulling segment.

The at least one brake lever is configured to brake a hub or a wheel of the bicycle, and the at least one brake lever includes a fixing segment formed on an end of the at least one brake lever and connected with at least one electromagnetic clutch. The at least one electromagnetic clutch includes a bolt attracted electromagnetically by the at least one electromagnetic clutch after conducting a power so as to remove from or move into the coupling orifice, and a defining orifice is defined adjacent to the at least one electromagnetic clutch, such that a rotatable column is inserted through the coupling orifice, the through orifice, and the defining orifice, wherein a rotating angle of the at least one brake lever is sensed by the rotatable column.

The at least one angle signal sensor is connected with the extension and configured to sense and send the rotating angle of the rotatable column.

The at least one power failure sensor has a movable sensing head and configured to sense a movement of the at least one brake lever, and when the at least one brake lever moves, the at least one power failure sensor is released and sends a conductive signal to an anti-lock brake.

When the at least one battery/cell has insufficient power, the bolt of the at least one electromagnetic clutch is not driven by the at least one electromagnet and moves upward into the receiving orifice of the at least one rotary arm. When braking the hub or the wheel, the at least one brake lever is pressed and the at least one rotary arm is pulled so that the at least one rotary arm and the at least one brake lever rotate along the rotatable column, the at least one rotary arm pulls the brake cable unit, and a stopping segment (such as a disc brake or a rubber brake seat) is pulled by the brake cable unit to brake the hub or the wheel mechanically.

After the at least one battery/cell is powered on, the bolt is attracted downward electromagnetically by the at least one electromagnetic clutch to press the spring and to remove from the receiving orifice of the at least one rotatory arm. Then, the at least one brake lever s pressed to rotate along the rotatable column, and the at least one rotatory arm matches with the brake cable unit and does not move, wherein the rotating angle of the at least one brake lever is sensed by the rotatable column, and the movable sensing head of the at least one power failure sensor is not biased by the at least one brake lever and sends the conductive signal, and the at least one angle signal sensor senses and encodes the rotating angle of the rotatable column to the rotating angle signal, and the rotating angle signal is sent to the circuit board so that the stopping segment of the anti-lock brake brakes the hub or the wheel of the bicycle, thus controlling the anti-lock brake electrically.

DETAILED DESCRIPTION OF THE PREFERRED EMBODIMENTS

Figure 1:
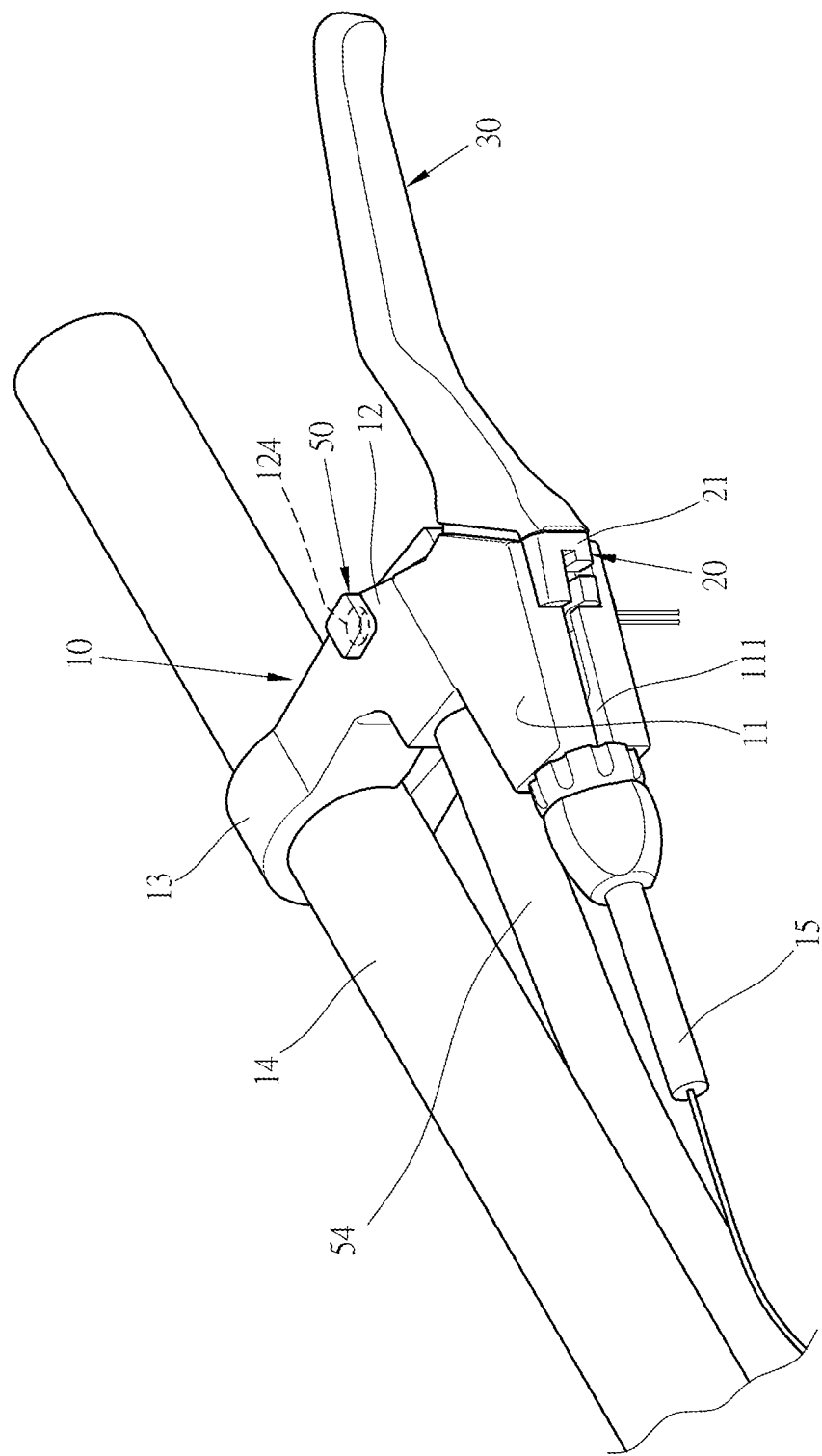
FIG. 1 is a perspective view showing the assembly of a brake handle structure for a bicycle according to a preferred embodiment of the present invention.
Figure 2:
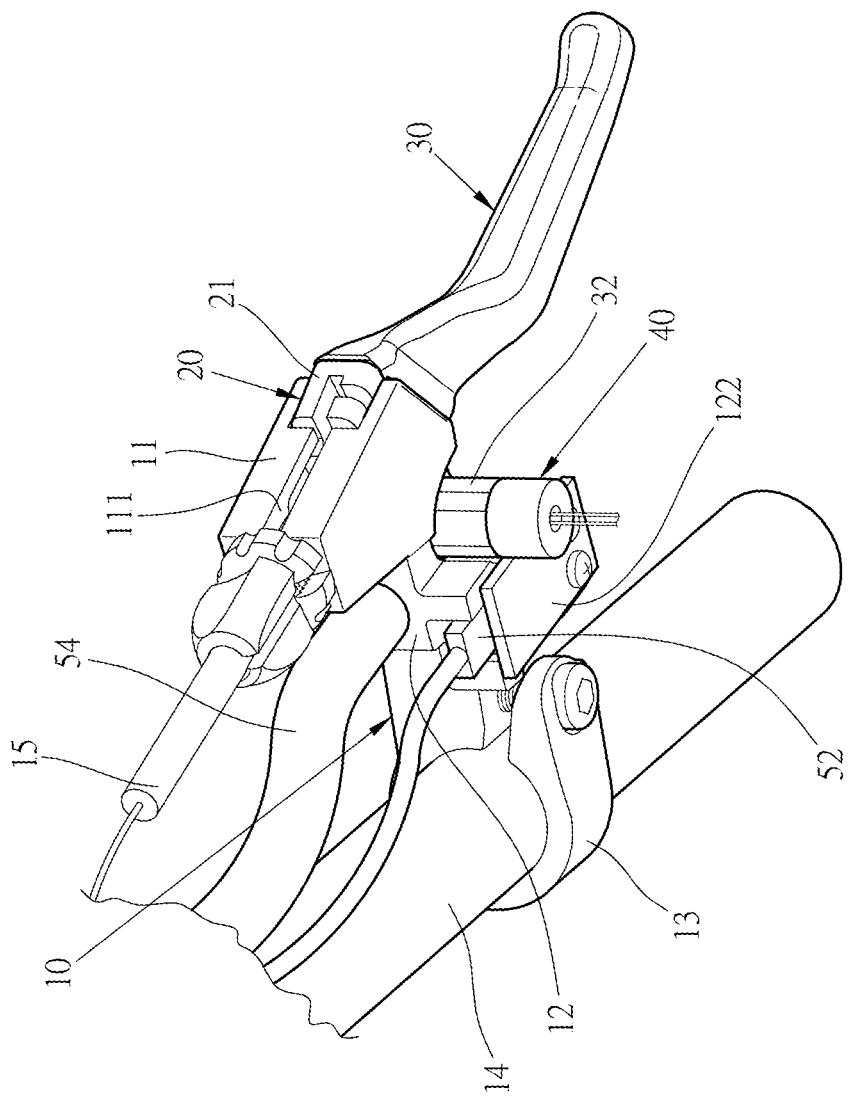
FIG. 2 is another perspective view showing the assembly of the brake handle structure for the bicycle according to the preferred embodiment of the present invention.
Figure 3:
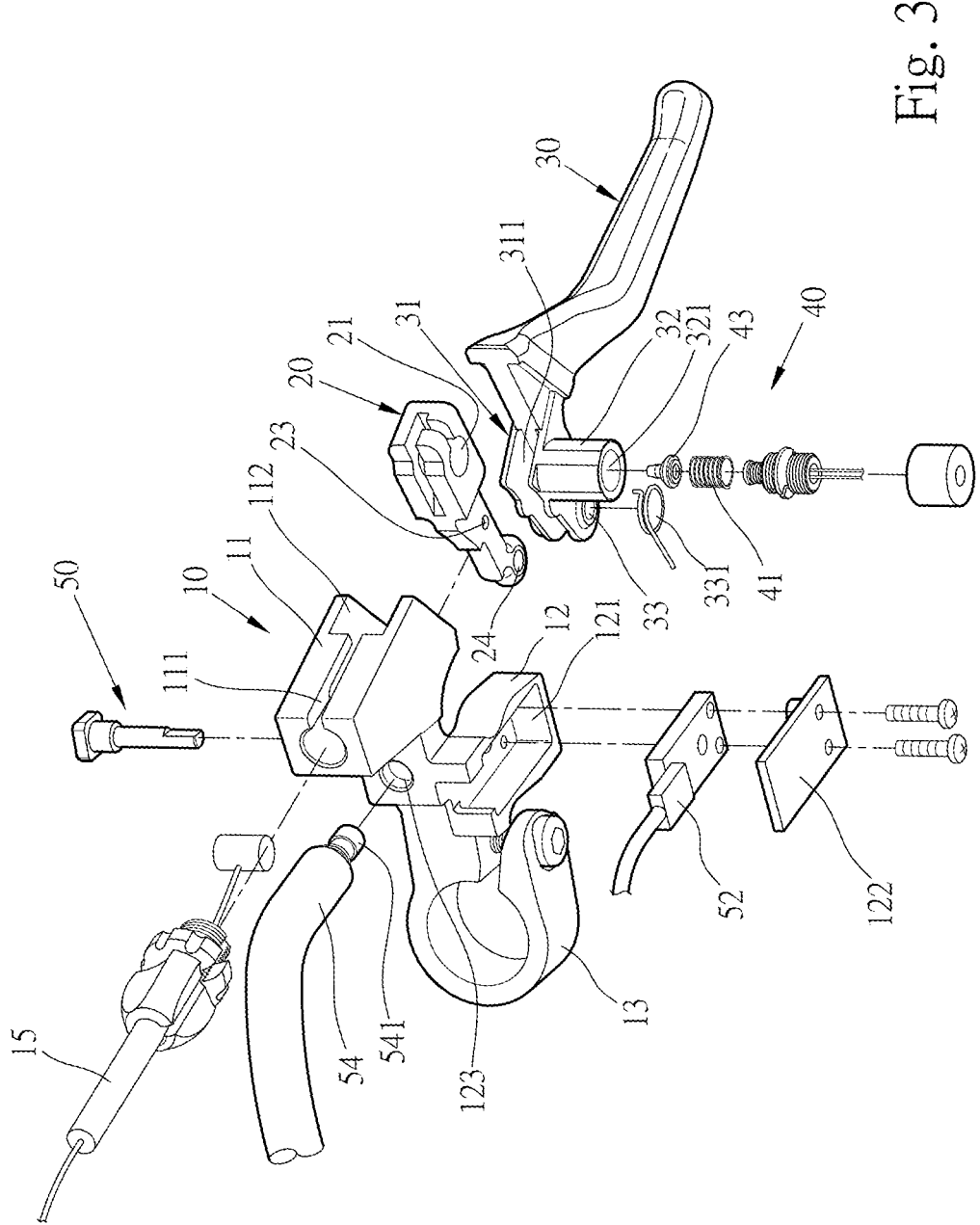
FIG. 3 is a perspective view showing the exploded components of the brake handle structure for the bicycle according to the preferred embodiment of the present invention.

With reference to FIGS. 1-3, a brake handle structure for a bicycle according to a preferred embodiment of the present invention is capable of controlling an anti-lock brake mechanically or electrically, and the brake handle structure comprises: at least one body 10, at least one rotary arm 20, at least one brake lever 30, at least one electromagnetic clutch 40, at least one power failure sensor 54, and at least one angle signal sensor 52.

The at least one body 10 is configure to connect all related element of the brake handle structure, and the at least one body 10 includes a connection portion 11 formed on a first end thereof, an extension 12 having a first side connected with a first side of the connection portion 11, an engagement portion 13 formed in a C ring shape, connected with a second side of the extension 12, and configured to engage a handle 14, wherein the connection portion 11 has a groove 111 defined adjacent to a second side thereof and configured to receive a brake cable unit 15, and the connection portion 11 has a cavity 112 defined on an end thereof and configured to receive the at least one rotatory arm 20, wherein the extension 12 has a recess 121 defined on a bottom thereof, a cap 122 covering the recess 121, a notch 123 extending above the recess 121, and a through orifice 124 perpendicular to the notch 123.

The at least one rotatory arm 20 is received in the cavity 112 of the connection portion 11 and is rotatably connected in the extension 12, and the at least one rotary arm 20 includes a pulling segment 21 formed on a first end thereof, a coupling orifice 24 defined on a second end of the at least one rotary arm 20, a receiving orifice 23 passing between the coupling orifice 24 and the pulling segment 21, wherein the coupling orifice 24 corresponds to the through orifice 124 of the at least one body 10, and the pulling segment 21 is engaged with an end of the brake cable unit 15 in the cavity 112 so that the at least one rotatory arm 20 pulls the brake cable unit 15.

The at least one brake lever 30 is configured to brake a hub or a wheel of the bicycle (not shown), and the at least one brake lever 30 includes a fixing segment 31 formed on an end thereof, connected with the at least one rotatory arm 20, and having a trough 311, a hollow accommodation portion 32 extending from a bottom of the trough 311, and a defining orifice 33 defined on the trough 311 adjacent to the hollow accommodation portion 32, such that the pulling segment 21 of the at least one rotatory arm 20 is accommodated into the trough 311 so that the hollow accommodation portion 32 is in communication with the receiving orifice 23 and the through orifice 124 of the at least one body 10, the defining orifice 33 communicates with the coupling orifice 24, and the at least one brake lever 30 is hooked with a torsion spring 331, removed from, and biased against the pulling segment 21 of the at least one rotatory arm 20. For example, as shown in FIGS. 1 and 4, the pulling segment 21 of the at least one rotatory arm 20 is biased against the at least one brake lever 30.

The at least one electromagnetic clutch 40 is received in the hollow accommodation portion 32 and is electrically connected to a circuit board (not shown) on which at least one battery/cell and an anti-lock brake system (ABS) are electrically connected, and the at least one electromagnetic clutch 40 includes a spring 41 and a bolt 43 connected with the spring 41 so that the bolt 43 is attracted electromagnetically by at least one electromagnet of the at least one electromagnetic clutch 40 to move downward or upward. After an electromagnetic attraction of the at least one electromagnet disappears, the spring 41 moves back to an original position to push the bolt 43 to upward move into the receiving orifice 23, thus connecting the at least one rotatory arm 20 and the at least one brake lever 30.

Figure 4:
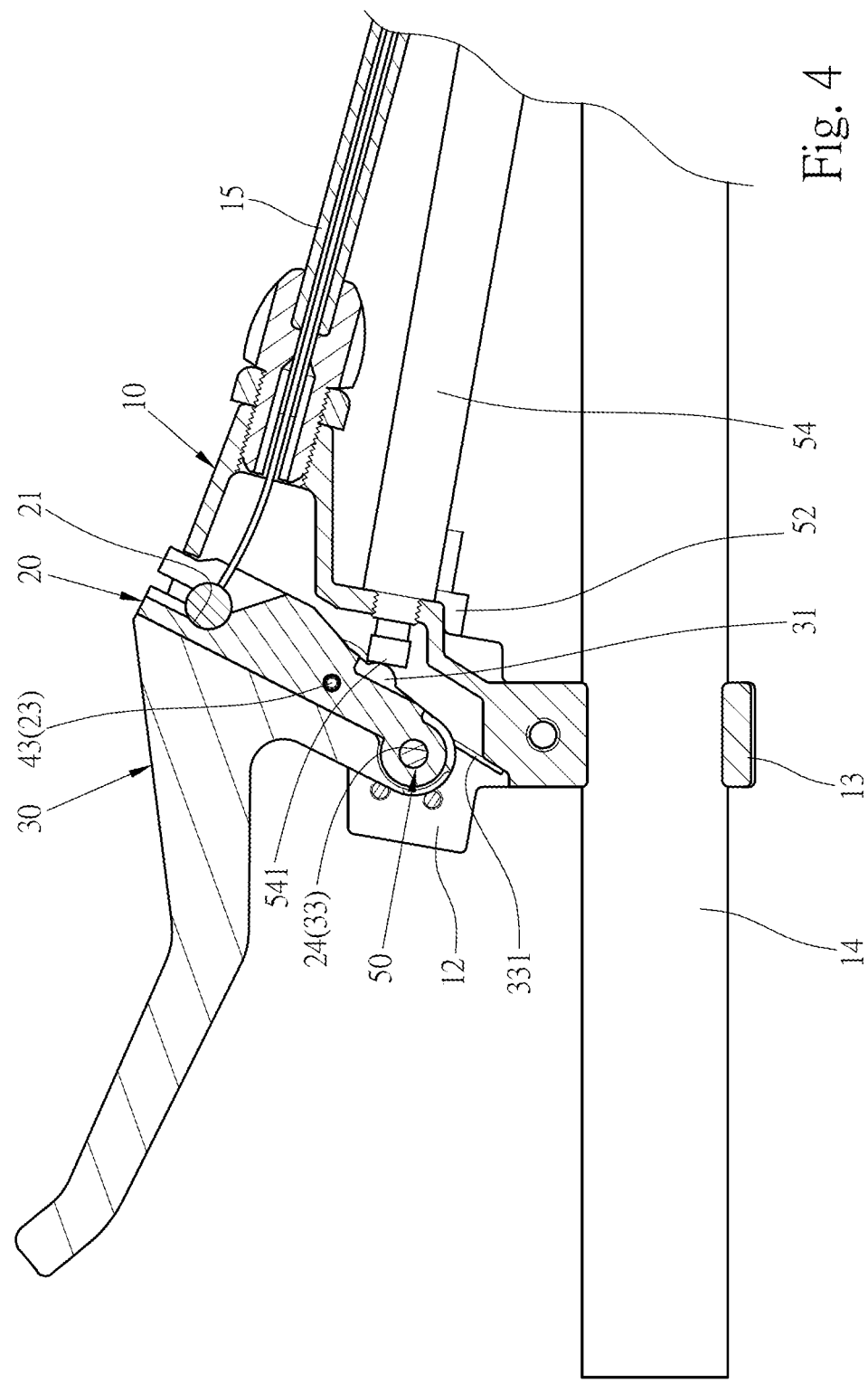
FIG. 4 is a cross sectional view showing the operation of the brake handle structure for the bicycle according to the preferred embodiment of the present invention.

Referring to FIGS. 1, 3, and 4, a rotatable column 50 is inserted through the through orifice 124, the coupling orifice 24, and the defining orifice 33 to connect with the torsion spring 331, such that the at least one rotatory arm 20 and the at least one brake lever 30 rotate along the rotatable column 50. The at least one brake lever 30 is pressed to send a braking signal, and the recess 121 of the extension 12 accommodates the at least one angle signal sensor 52 configured to sense the rotating angle of the rotatable column 50 so that the at least one angle signal sensor 52 senses and encodes the rotating angle of the rotatable column 50 to a rotating angle signal, and the rotating angle signal is sent to an anti-lock brake by the at least one angle signal sensor 52, thus braking the hub of the bicycle. The notch 123 accommodates the at least one power failure sensor 54, and the at least one power failure sensor 54 has a movable sensing head 541, wherein when the at least one brake lever 30 moves, the at least one power failure sensor 54 is released and is locked by the at least one brake lever 30, and the at least one battery/cell is electrically conducted and outputs a power to the circuit board so that the anti-lock brake is driven by the circuit board to brake the hub, as shown in FIGS. 1 and 2.

Figure 5:
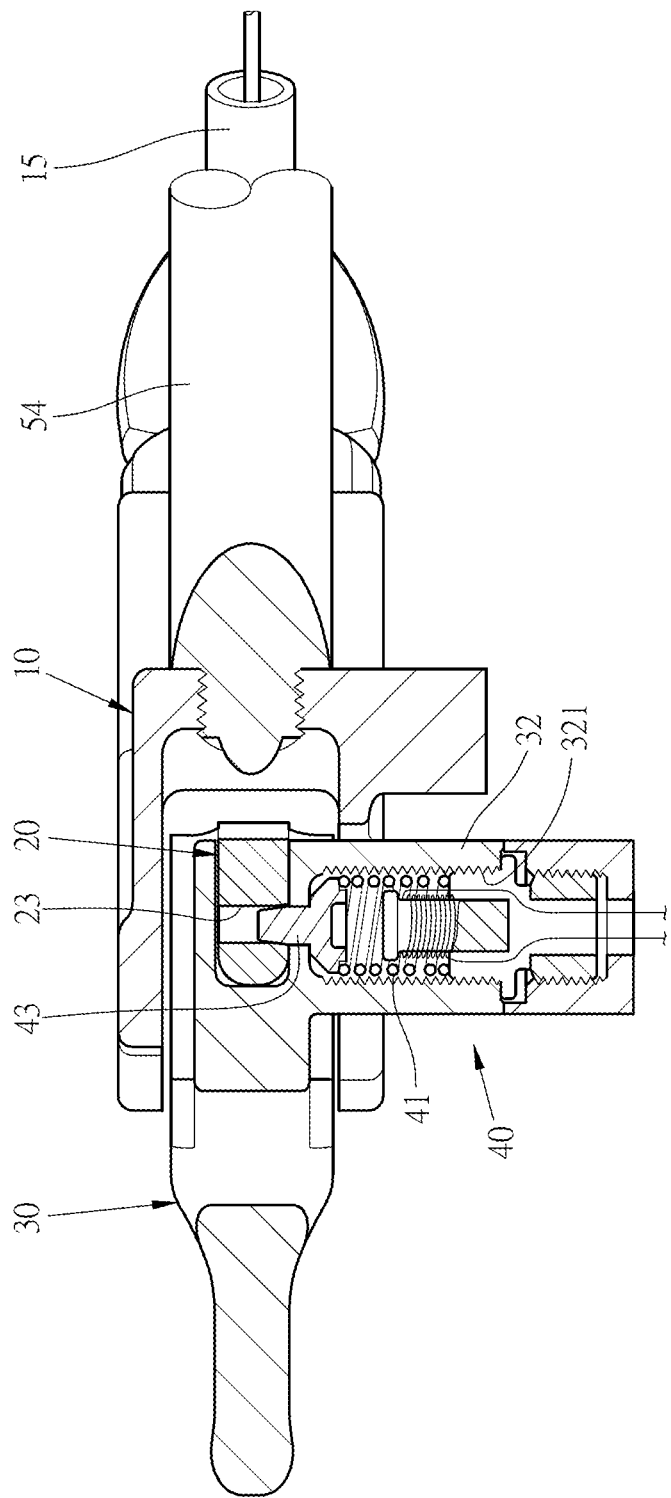
FIG. 5 is another cross sectional view showing the operation of the brake handle structure for the bicycle according to the preferred embodiment of the present invention.

As illustrated in FIGS. 4 and 5, the end of the at least one brake lever 30 abuts against the at least one rotatory arm 20 so as to not rotate, such that the rotatable column 50 does not output the rotating angle signal, the movable sensing head 541 of the at least one power failure sensor 54 is biased by the fixing segment 31 of the at least one brake lever 30, and the at least one battery/cell is powered off to avoid a braking of the anti-lock brake.

Figure 6:
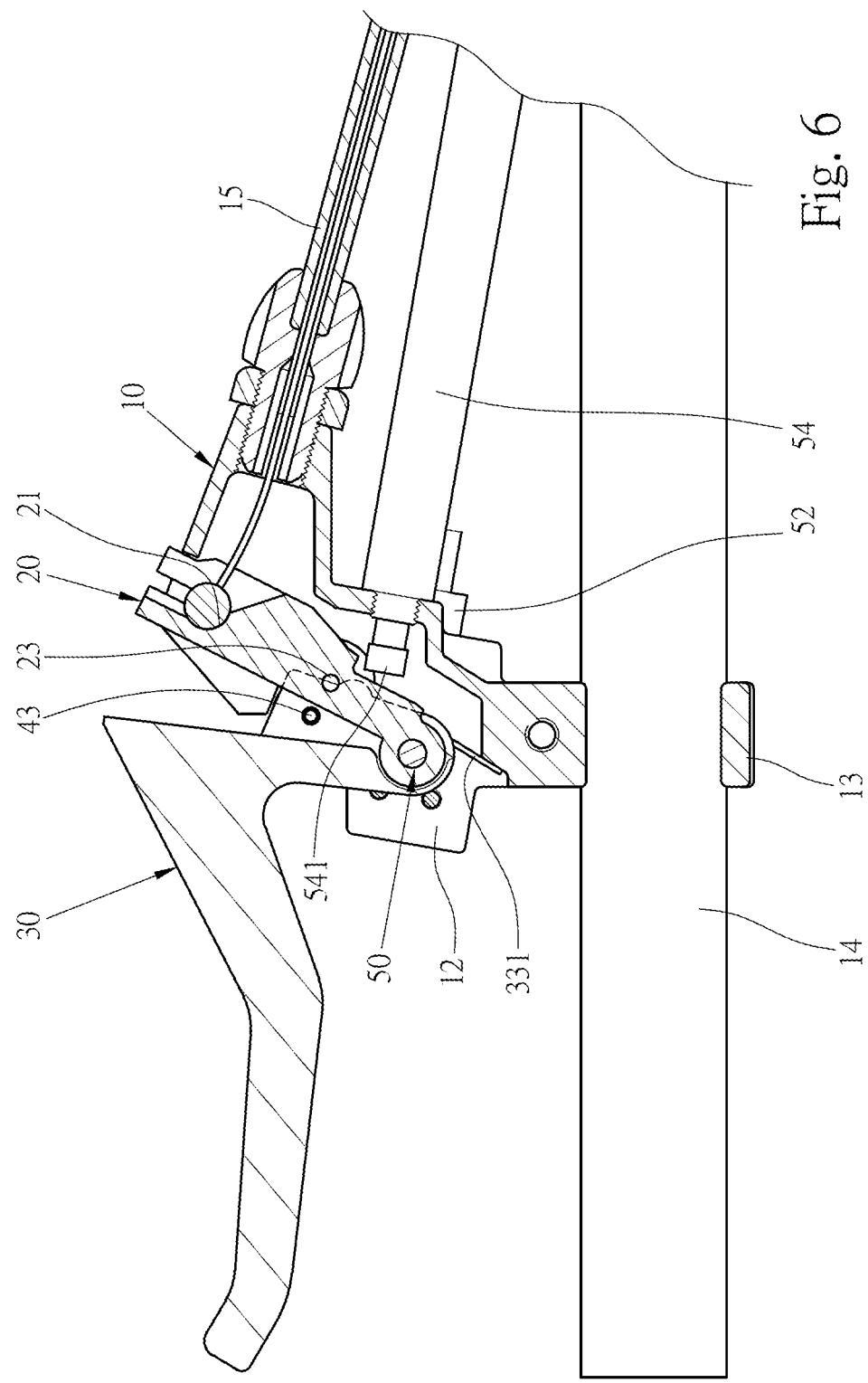
FIG. 6 is also another cross sectional view showing the operation of the brake handle structure for the bicycle according to the preferred embodiment of the present invention.
Figure 7:
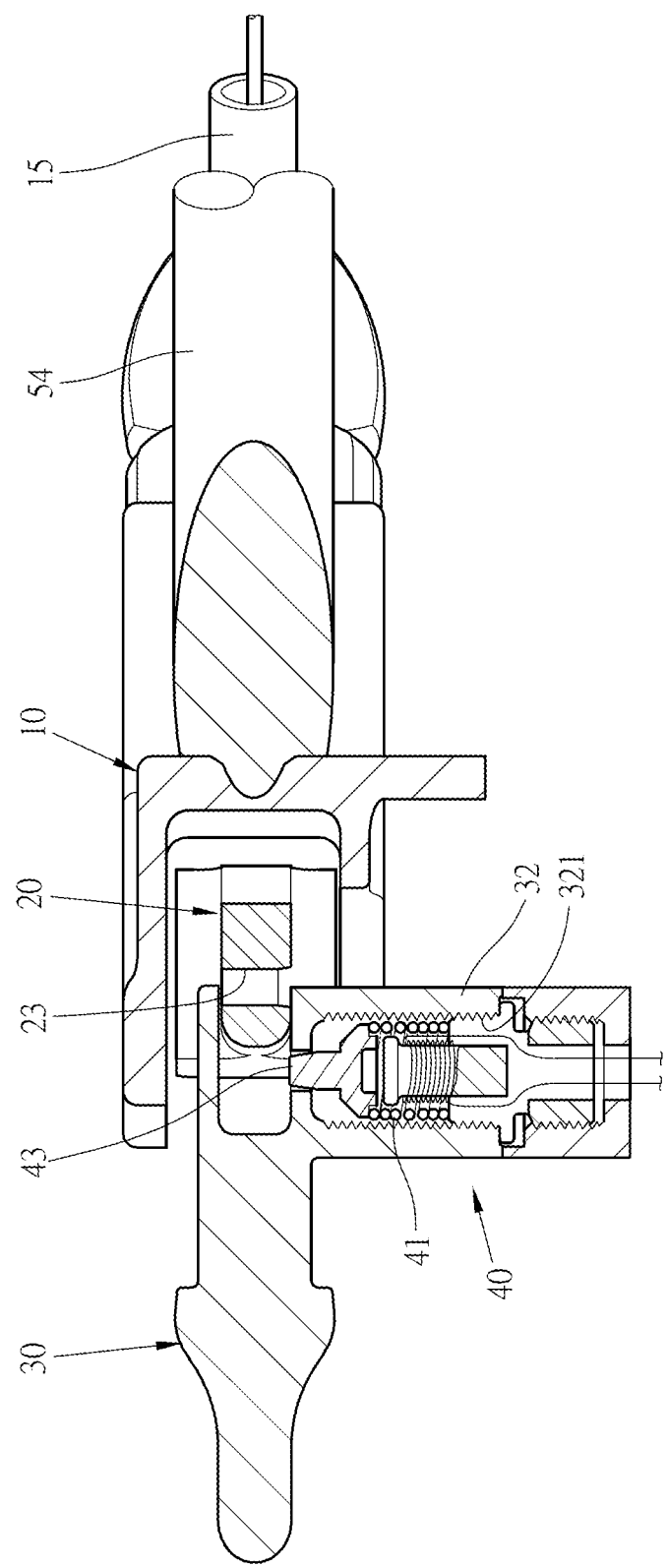
FIG. 7 is still another cross sectional view showing the operation of the brake handle structure for the bicycle according to the preferred embodiment of the present invention.

With reference to FIGS. 6 and 7, after the at least one battery/cell is powered on, the bolt 43 is attracted downward electromagnetically by the at least one electromagnetic clutch 40 to press the spring 41 and to remove from the receiving orifice 23 of the at least one rotatory arm 20. Then, the at least one brake lever 30 is pressed to rotate along the rotatable column 50, and the at least one rotatory arm 20 matches with the brake cable unit 15 and does not move, wherein a rotating angle of the at least one brake lever 30 is sensed by the rotatable column 50, and the movable sensing head 541 of the at least one power failure sensor 54 is not biased by the at least one brake lever 30 and sends a conductive signal, the at least one angle signal sensor 52 senses and encodes the rotating angle of the rotatable column 50 to the rotating angle signal, and the rotating angle signal is sent to the circuit board so that the anti-lock brake brakes the hub or the wheel of the bicycle, thus controlling the anti-lock brake electrically.

Figure 8:
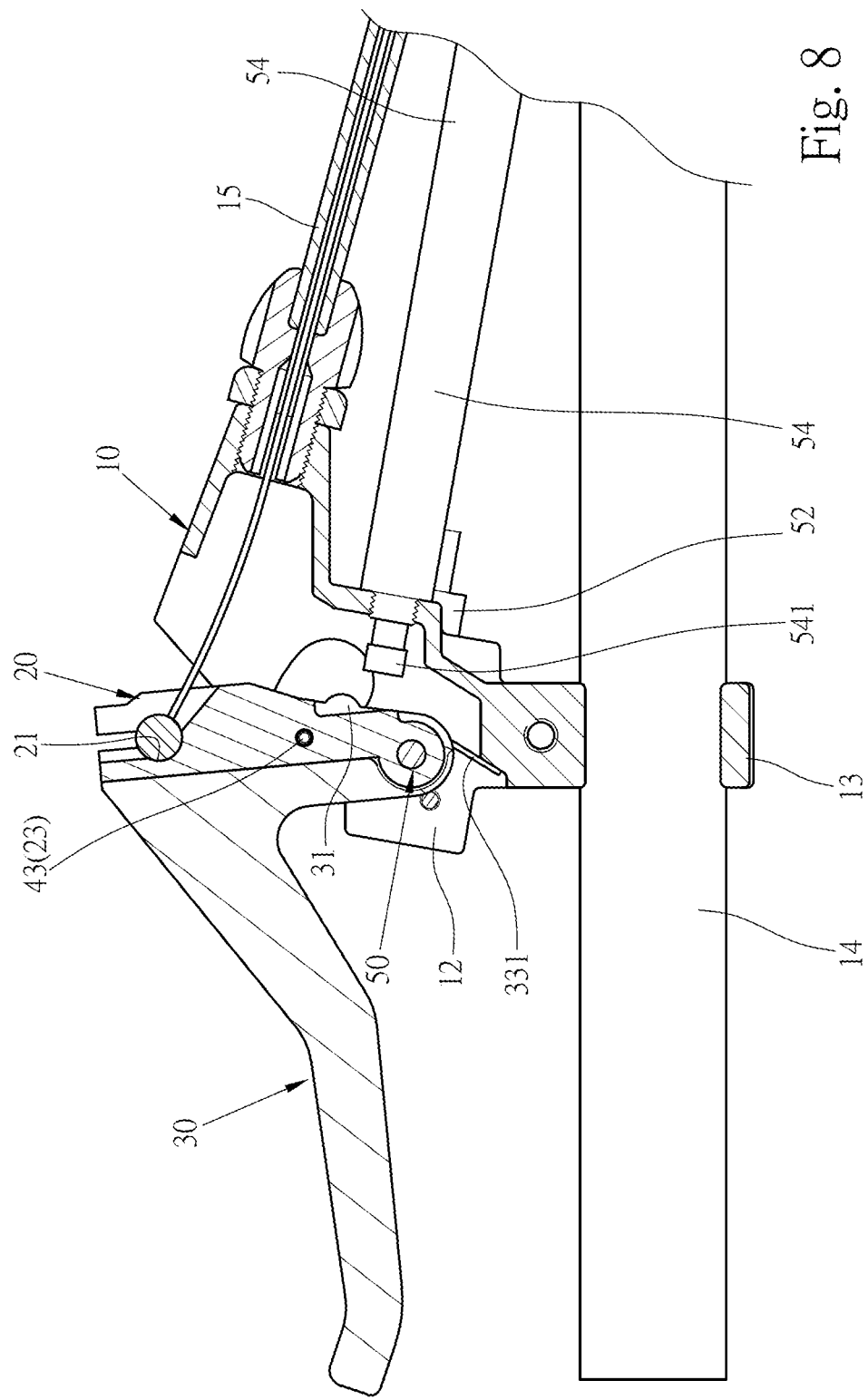
FIG. 8 is another cross sectional view showing the operation of the brake handle structure for the bicycle according to the preferred embodiment of the present invention.
Figure 9:
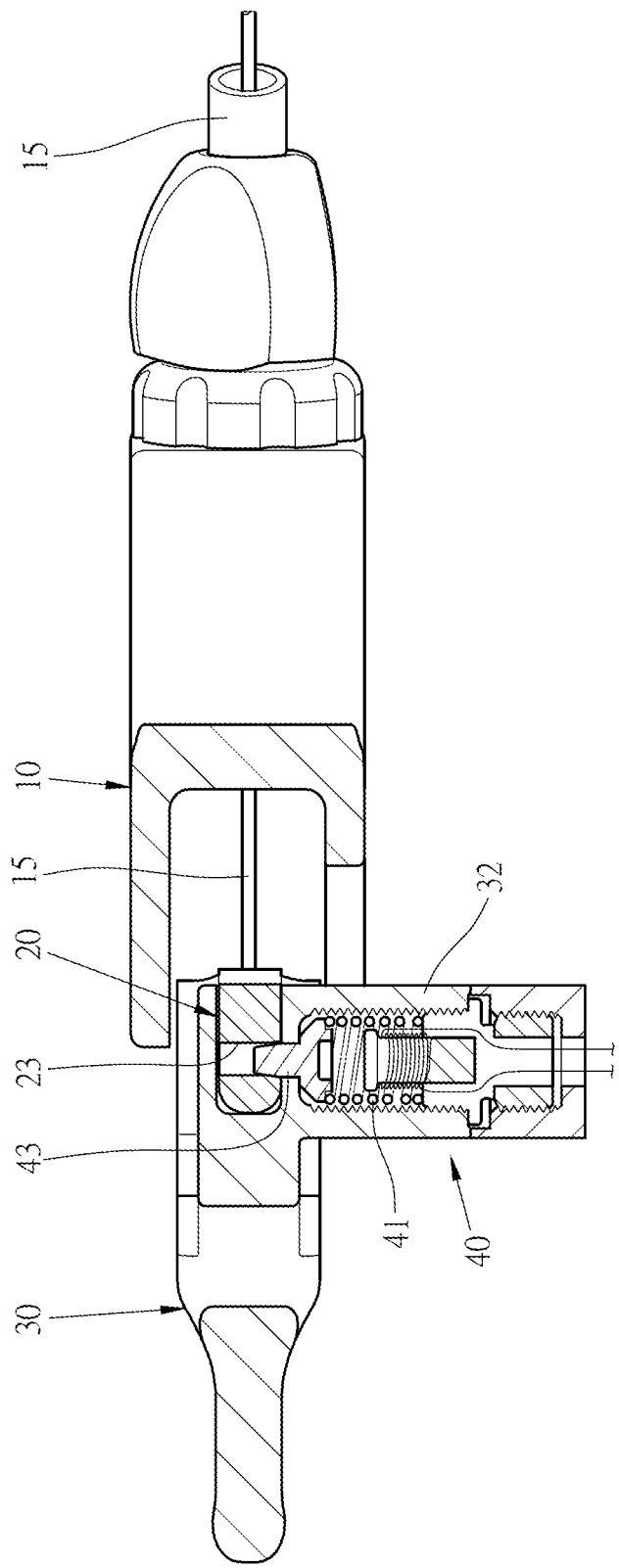
FIG. 9 is also another cross sectional view showing the operation of the brake handle structure for the bicycle according to the preferred embodiment of the present invention.

Referring to FIGS. 8 and 9, when the at least one battery/cell has insufficient power, the bolt 43 of the at least one electromagnetic clutch 40 is not driven by the at least one electromagnet and moves upward into the receiving orifice 23 of the at least one rotary arm 20. When braking the hub or the wheel, the at least one brake lever 30 is pressed and the at least one rotary arm 20 is pulled so that the at least one rotary arm 20 and the at least one brake lever 30 rotate along the rotatable column 50, the at least one rotary arm 20 pulls the brake cable unit 15, and a stopping segment (such as a disc brake or a rubber brake seat) is pulled by the brake cable unit 15 to brake the hub or the wheel mechanically.

After the at least one battery/cell is powered on, the bolt 43 is attracted downward electromagnetically by the at least one electromagnetic clutch 40 to press the spring 41 and to remove from the receiving orifice 23 of the at least one rotatory arm 20. Then, the at least one brake lever 30 is pressed to rotate along the rotatable column 50, and the at least one rotatory arm 20 matches with the brake cable unit 15 and does not move, wherein the rotating angle of the at least one brake lever 30 is sensed by the rotatable column 50, and the movable sensing head 541 of the at least one power failure sensor 54 is not biased by the at least one brake lever 30 and sends the conductive signal, the at least one angle signal sensor 52 senses and encodes the rotating angle of the rotatable column 50 to the rotating angle signal, and the rotating angle signal is sent to the circuit board so that the stopping segment of the anti-lock brake brakes the hub or the wheel of the bicycle, thus controlling the anti-lock brake electrically.

While the preferred embodiments of the invention have been set forth for purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A brake handle structure for a bicycle comprising:
   at least one body including a connection portion formed on a first end of the at least one body, an extension having a first side connected with a first side of the connection portion, and an engagement portion connected with a second side of the extension, wherein the connection portion receives a brake cable unit and has a through orifice defined on a predetermined position of the connection portion;
   at least one rotatory arm received in the connection portion and rotatably connected in the extension, and the at least one rotary arm including a pulling segment formed on a first end of the at least one rotary arm so as to pull the brake cable unit, a coupling orifice defined on a second end of the at least one rotary arm, and a receiving orifice passing between the coupling orifice and the pulling segment;
   at least one brake lever configured to brake a hub or a wheel of the bicycle, and the at least one brake lever including a fixing segment formed on an end of the at least one brake lever and connected with at least one electromagnetic clutch, wherein the at least one electromagnetic clutch includes a bolt attracted electromagnetically by the at least one electromagnetic clutch after conducting a power so as to remove from or move into the coupling orifice, and a defining orifice is defined adjacent to the at least one electromagnetic clutch, such that a rotatable column is inserted through the coupling orifice, the through orifice, and the defining orifice, wherein a rotating angle of the at least one brake lever is sensed by the rotatable column;
   at least one angle signal sensor connected with the extension and configured to sense and send the rotating angle of the rotatable column; and
   at least one power failure sensor having a movable sensing head and configured to sense a movement of the at least one brake lever, and when the at least one brake lever moves, the at least one power failure sensor is released and sends a conductive signal to an anti-lock brake.

2. The brake handle structure as claimed in claim 1, wherein the connection portion of the at least one body has a groove defined adjacent to a second side thereof and configured to receive the brake cable unit, and the connection portion has a cavity defined on an end thereof and configured to receive the at least one rotatory arm, wherein the extension has a recess defined on a bottom thereof and configured to receive the at least one angle signal sensor, a cap covering the recess, a notch extending above the recess and configured to accommodates the at least one power failure sensor, and the through orifice perpendicular to the notch.

3. The brake handle structure as claimed in claim 1, wherein the fixing segment of the at least one brake lever has a trough, a hollow accommodation portion extending from a bottom of the trough, and the defining orifice defined on the trough adjacent to the hollow accommodation portion, such that the pulling segment of the at least one rotatory arm is accommodated into the trough so that the hollow accommodation portion is in communication with the receiving orifice and the through orifice of the at least one body, and the bolt of the at least one electromagnetic clutch is removed from or moved into the receiving orifice of the at least one rotatory arm.

* * * * *